US009071901B2

(12) United States Patent
Black (10) Patent No.: US 9,071,901 B2
(45) Date of Patent: Jun. 30, 2015

(54) WIRELESS COMMUNICATION SYSTEM FOR USE BY TEAMS

(75) Inventor: Bruce Black, Hamilton (CA)

(73) Assignee: Bruce Black, Hamilton, Ontario (CA)

( * ) Notice: Subject to any disclaimer, the term of this patent is extended or adjusted under 35 U.S.C. 154(b) by 314 days.

(21) Appl. No.: 13/593,642

(22) Filed: Aug. 24, 2012

(65) Prior Publication Data

US 2013/0052943 A1 Feb. 28, 2013

(51) Int. Cl.
*H04B 7/15* (2006.01)
*H04R 5/033* (2006.01)
*H04W 84/08* (2009.01)

(52) U.S. Cl.
CPC ............... *H04R 5/033* (2013.01); *H04W 84/08* (2013.01); *Y02B 60/50* (2013.01)

(58) Field of Classification Search
CPC ..... H04W 84/18; H04W 88/04; H04W 88/06; H04W 4/00; H04W 92/02; H04W 76/02; H04W 72/02
USPC ........... 340/384.72, 573.3, 555, 539.1, 573.1, 340/904; 370/349, 449, 392; 381/103, 11, 381/302, 312, 315, 334, 370, 380, 381, 57, 381/58, 71.6, 73.1; 455/3.06, 344, 39, 455/41.1–41.3, 519, 556.1, 569.1, 66.1, 99
See application file for complete search history.

(56) References Cited

U.S. PATENT DOCUMENTS

| | | |
|---|---|---|
| 6,032,051 A | 2/2000 | Hall et al. |
| 6,652,284 B2 | 11/2003 | August et al. |
| 2005/0049080 A1 | 3/2005 | Hovington |
| 2005/0170791 A1* | 8/2005 | Tabata et al. ................. 455/90.3 |
| 2005/0170870 A1 | 8/2005 | Goldenberg et al. |
| 2005/0212202 A1 | 9/2005 | Meyer |
| 2007/0111754 A1* | 5/2007 | Marshall et al. ........... 455/556.1 |
| 2008/0096600 A1* | 4/2008 | Siegel ............................ 455/519 |
| 2008/0153557 A1 | 6/2008 | Matveev |
| 2010/0077536 A1 | 4/2010 | Daniel et al. |
| 2010/0080389 A1 | 4/2010 | Daniel et al. |
| 2010/0086152 A1* | 4/2010 | Rank et al. ..................... 381/313 |
| 2010/0206976 A1* | 8/2010 | Salentine et al. .......... 242/379.2 |

* cited by examiner

*Primary Examiner* — Golam Sorowar
(74) *Attorney, Agent, or Firm* — Bereskin & Parr LLP/S.E.N.C.R.L., s.r.l.

(57) ABSTRACT

A wireless communication system comprises a first wireless communication device for a first team member, and a second wireless communication device for a second team member. The first wireless communication device comprises a microphone and a transmitter for transmitting an oral message via a first wireless communication protocol. The second wireless communication device comprises a main transceiver, a headset, and a support for mounting the main transceiver to the second team member remotely from the headset. The main transceiver receives the oral message from the first wireless communication device via the first communication protocol and retransmits the oral message via a second wireless communication protocol to the headset for generating audio corresponding to the oral message. The second wireless communication protocol operates at a lower power than the first wireless communication protocol, and the first communication protocol operates over a longer range than second wireless communication protocol.

15 Claims, 10 Drawing Sheets

WIRELESS COMMUNICATION SYSTEM FOR USE BY TEAMS

RELATE APPLICATIONS

This application claims priority to Canadian Patent Application No. 2,750,509, filed on Aug. 26, 2011 and entitled "WIRELESS COMMUNICATION SYSTEM FOR USE BY TEAMS", the entire contents of which are hereby incorporated by reference herein for all purposes.

TECHNICAL FIELD

The invention relates to wireless communication systems, and in particular to wireless communication systems for use by teams such as sports teams.

BACKGROUND

When working together as a team, it is generally desirable for team members to communicate with each other. For example, when playing team sports, it is desirable for teammates, coaches and other individuals to communicate with each other. However, these individuals may be physically separated by distances that do not allow face-to-face conversations.

Some communication systems have been developed to allow communication between team members playing team sports. For example, U.S. Patent Application Publication Number 2005/0212202 (Meyer) discloses a communication system for providing instruction, information, and verbal commands between a sports coach and a player. The system comprises a microphone and a transmitter for the coach, and a receiver and a speaker for each player. When the coach desires to talk to players, he activates the microphone and speaks into it. According to Meyer, the system can wirelessly transmit the coach's voice to the players despite physical separation therebetween.

One problem with the wireless communication system of Meyer is that the wireless electronics tend to be high power devices, for example, those associated with radio frequencies such as AM, FM, citizen's band, and family radio frequencies. These high power devices can represent unacceptable safety risks for users, and particularly for children, when the electronics are mounted close to the user's head. While it might be possible to use some low power devices, these low power devices typically have a limited range which can interrupt communication between individuals over long distances.

Another problem is that it can be difficult for players to selectively communicate with other individuals while playing the sport. While Meyer discloses the possibility of providing the player receiver with an optional microphone and transmitter for two-way communication, there is no way for players to send transmissions only at certain times, or to certain players.

In view of the above system, there is a need for an improved communication system for use in team sports.

SUMMARY OF THE INVENTION

According to one aspect of the invention, there is a wireless communication system for use by members of a team. The wireless communication system comprises a first wireless communication device for a first team member, and a second wireless communication device for a second team member. The first wireless communication device comprises a microphone for enabling the first team member to input an oral message, and a transmitter for transmitting the oral message via a first wireless communication protocol. The second wireless communication device comprises a main transceiver, a wearable audio device, and a support for mounting the main transceiver to the second team member in a location physically remote from the wearable audio device. The main transceiver receives the oral message from the first wireless communication device via the first wireless communication protocol and retransmits the oral message via a second wireless communication protocol. The wearable audio device comprises a receiver for receiving the oral message from the main transceiver via the second wireless communication protocol, and at least one speaker in communication with the receiver for generating audio corresponding to the oral message. The speaker is mounted to the wearable audio device so as to be spaced apart from an ear of the second team member such that the second team member is able to hear ambient sound in addition to the oral message. The second wireless communication protocol operates at a lower power than the first wireless communication protocol, and the first communication protocol operates over a longer range than second wireless communication protocol.

In some embodiments the wearable audio device of the second wireless communication device may comprise a transmitter and a microphone in communication with the transmitter for enabling the second team member to send an outgoing oral message to the main transceiver via the second communication protocol. The main transceiver may be configured to retransmit the outgoing oral message to another wireless communication device via the first wireless communication protocol.

In some embodiments the second wireless communication device may further comprise a stick trigger mountable to a hockey stick. The stick trigger may be in communication with the main transceiver such that actuating the stick trigger enables transmission of the outgoing oral message.

In some embodiments the wearable audio device may be a headset mountable to a helmet. In some embodiments the wearable audio device may comprise epaulet speakers.

In some embodiments the second wireless communication protocol may operate at a power of less than about 3-milliwatts. In some embodiments the second wireless communication protocol may operate over a maximum range of less than about 10-meters.

In some embodiments the first communication protocol may operate over a range of at least about 50 meters. In some embodiments the first wireless communication protocol may operate at a minimum power of at least about 50-milliwatts.

According to another aspect of the present invention, there is a wireless communication system for use by members of a team. The wireless communication system comprises a first wireless communication device for a team leader and a plurality of second wireless communication devices, each of the second wireless communication devices being usable by a respective team member. The first wireless communication device comprises a microphone for enabling the team leader to input an oral message, and a transmitter for transmitting the oral message via a first wireless communication protocol. Each of the second wireless communication devices comprises a main transceiver, a wearable audio device, and a support for mounting the main transceiver to the respective team member in a location physically remote from the wearable audio device. The main transceiver receives the oral message from the first wireless communication device via the first wireless communication protocol and retransmits the oral message via a second wireless communication protocol. The wearable audio device comprises a receiver for receiving the oral message from the main transceiver via the second wireless communication protocol, and at least one speaker in communication with the receiver for generating audio corresponding to the oral message. The speaker is mounted to the wearable audio device so as to be spaced apart from an ear of the respective team member such that the respective team member is able to hear ambient sound in addition to the oral message. The second wireless communication protocol operates at a lower power than the first wireless communication protocol, and the first communication protocol operates over a longer range than second wireless communication protocol. The first wireless communication device also comprises a group routing controller for selectively transmitting the oral message to at least one of the second wireless communication devices.

In some embodiments the group routing controller may include a group selection actuator for selectively transmitting the oral message to at least one group of the second wireless communication devices. In some embodiments the group routing controller may include a plurality of group selection actuators for selectively transmitting the oral message to a plurality of groups of the second wireless communication devices.

In some embodiments, the wireless communication system may include at least one scanner for detecting team members within a detection area. Furthermore, the first wireless communication device may transmit the oral message to team members located outside the detection area and not team members located within the detection area.

According to another aspect of the present invention, there is a wireless communication device for use by a team member. The wireless communication device comprises a main transceiver, a wearable audio device, and a support for mounting the main transceiver to the team member in a location physically remote from the wearable audio device. The main transceiver receives an incoming oral message from another wireless communication device via a first wireless communication protocol and retransmits the oral message via a second wireless communication protocol. The wearable audio device comprises a receiver for receiving the oral message from the main transceiver via the second wireless communication protocol, and at least one speaker in communication with the receiver for generating audio corresponding to the oral message. The speaker is mounted to the wearable audio device so as to be spaced apart from an ear of the team member such that the team member can hear ambient sounds in addition to the oral message. The second wireless communication protocol operates at a lower power than the first wireless communication protocol, and the first communication protocol operates over a longer range than second wireless communication protocol.

In some embodiments the wearable audio device may comprise a transmitter and a microphone in communication with the transmitter for enabling the team member to send an outgoing oral message to the main transceiver via the second communication protocol. The main transceiver may be configured to retransmit the outgoing oral message to at least one other wireless communication device via the first wireless communication protocol.

In some embodiments the wireless communication device may further comprise a stick trigger mountable to a hockey stick. The stick trigger may be in communication with the main transceiver such that actuating the stick trigger enables transmission of the outgoing oral message.

In some embodiments the support may comprise a containment receptacle for receiving the main transceiver, a mounting plate for supporting the containment receptacle on clothing worn by the team member, a first fastener for mounting the containment receptacle to the mounting plate, and a second fastener for mounting the containment receptacle to the mounting plate.

Other aspects and features of the invention will become apparent, to those ordinarily skilled in the art, upon review of the following description of some exemplary embodiments.

BRIEF DESCRIPTION OF THE DRAWINGS

The invention will now be described, by way of example only, with reference to the following drawings, in which.

DETAILED DESCRIPTION OF THE INVENTION

Figure 1:
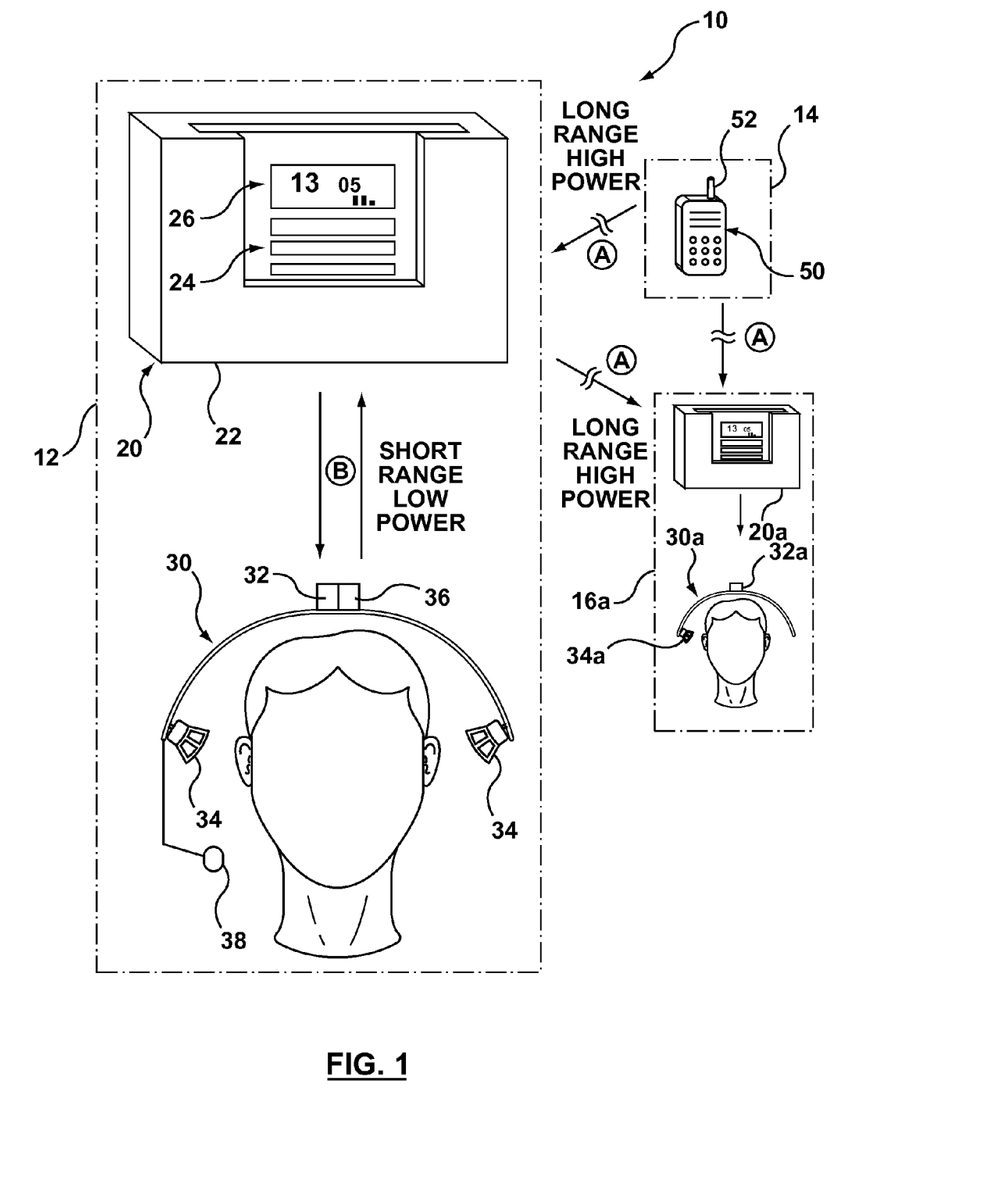
FIG. 1 is a schematic diagram of a wireless communication system comprising a plurality of wireless devices for use by a team such as a hockey team according to an embodiment of the present invention.

Referring to FIG. 1, illustrated therein is a wireless communication system 10 for use by teams including sports teams such as hockey, football, and soccer teams. The system includes a plurality of wireless communication devices 12, 14, and 16 that are in wireless communication with each other for transmitting oral messages between team members, such as players, coaches, game officials, spectators and the like. The wireless communication devices 12, 14, and 16 may provide one-way oral communication between a team leader and another team member, or may provide two-way oral communication between team members as will be described below.

As shown, one of the wireless communication devices 12 includes a main transceiver 20 and a wearable audio device such as a headset 30. The headset 30 includes a receiver 32 in wireless communication with the main transceiver 20, and one or more speakers 34 in communication with the receiver 32.

Generally, the main transceiver 20 receives an incoming oral message from another wireless communication device (e.g. one of the wireless communication devices 14 or 16) via a first wireless communication protocol (identified by reference numeral "A" in FIG. 1) and retransmits the oral message to the receiver 32 via a second wireless communication protocol (identified by reference numeral "B" in FIG. 1). The speakers 34 then generate audio corresponding to the oral message.

Figure 2:
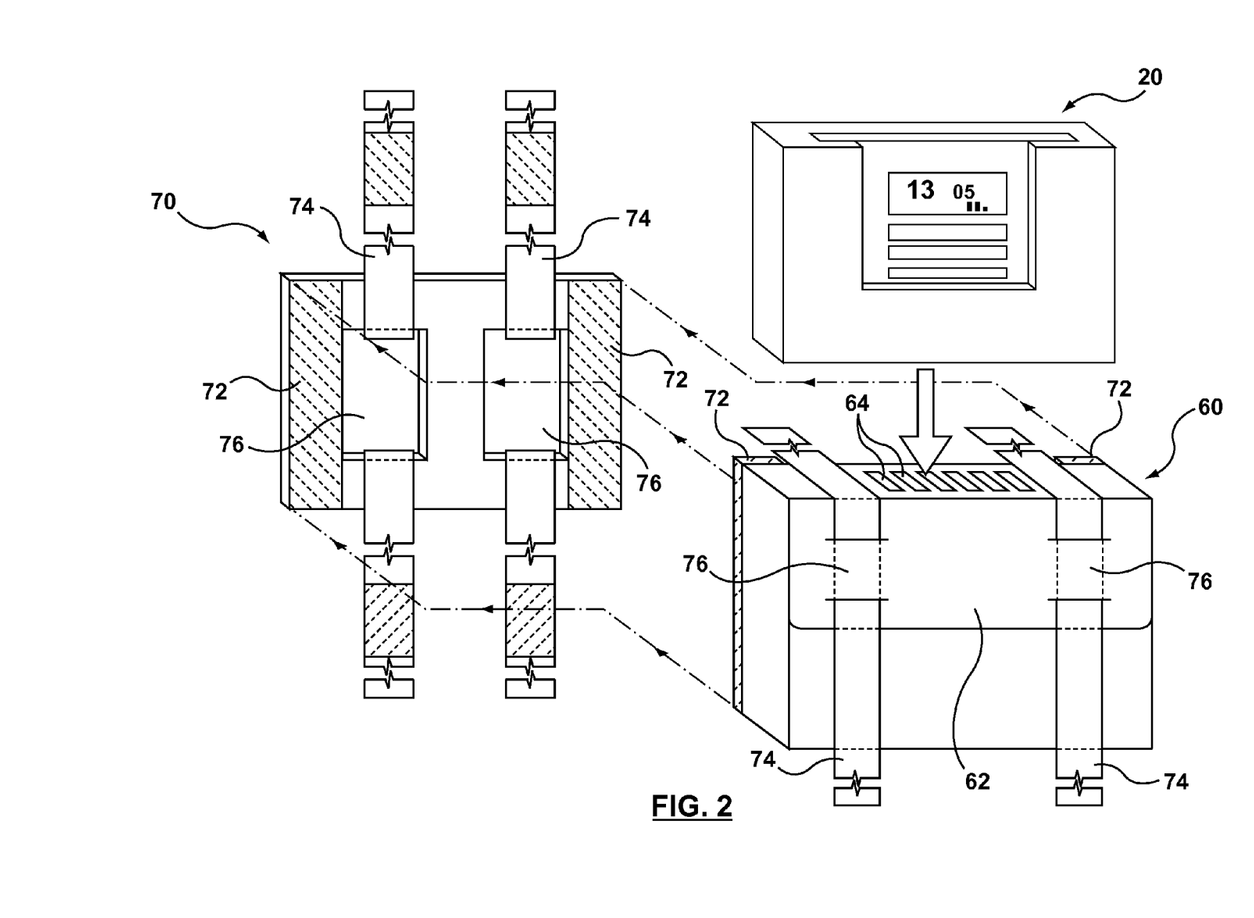
FIG. 2 is a perspective view of a mounting plate and a containment pouch for mounting a main transceiver of one of the wireless units of FIG. 1 to clothing worn by a team member.

The main transceiver 20 is generally mounted to the team member using a support (e.g. mounting plate 70 and a containment receptacle 60 as shown in FIG. 2), which may be attached to clothing such as sporting equipment used by the team member. The support generally positions the main transceiver in a location physically remote from the headset 30. For example, the main transceiver 20 may be mounted to shoulder pads, hockey pants, sports clothing (such as clothing made by Under Armour™), other types of sporting equipment or other types of clothing.

The main transceiver 20 includes an enclosure 22, which may be made from a durable and light material such as a polymer. The main transceiver 20 and the enclosure 22 may have a slim profile, which allows the main transceiver 20 to be attached to sporting equipment while minimizing interference with the functionality, safety or comfort provided by the sporting equipment.

As shown, the headset 30 is generally worn on the team member's head, and may be mounted to headgear worn by the team member, such as a hockey helmet, a football helmet, headband, and the like. The headset 30 may be installed on the headgear as an aftermarket accessory, or may be integrally manufactured as part of the headgear.

The headset 30 is generally mounted to the headgear in a way that is electrically and physically shock resistant. Electrical components of the headset 30 may also be contained so as to provide water resistance. The components of the headset 30 may also have a low profile so as to minimize interference with functionality, safety or comfort provided by the headgear.

The speakers 34 are generally mounted to the headset 30 such that the team member can hear ambient sounds in addition to incoming oral messages. For example, the speakers 34 may be mounted to the headset 30 so as to be spaced apart from the ears of the team member. The space between the speakers 34 and the ears enables sound waves from an ambient source to reach the team member's ear canal, which may permit the team member to hear ambient sounds. This may be particularly beneficial to certain team members (such as players or game officials in a team sport) because these individuals might need to hear gameplay sounds in addition to incoming oral messages.

As indicated above, the main transceiver 20 of the wireless communication device 12 receives incoming oral messages via the first wireless communication protocol A and retransmits the oral message to the receiver 32 of the headset 30 via the second wireless communication protocol B. The first communication protocol A generally operates over a long range and at a high power for transmission between the wireless communication devices 12, 14 and 16. In contrast, the second communication protocol B operates over a short range and at a low power for transmission between the main transceiver 20 and respective headset 30. For example, the second wireless communication protocol B may operate at a power of less than about 3-milliwatts (such as BlueTooth™ class 2 or class 3), whereas the first communication protocol A may operate at a higher power, for example, of up to about 500-milliwatts (such as FRS Radio) or up to about 5-watts (such as GMRS Radio).

Operating the second wireless communication protocol B at a low power tends to reduce the range of the communication system 10. For example, BlueTooth™ class 2 or class 3 devices typically have a limited range of up to about 10 meters, which is generally not sufficient for communication between players, coaches and other team members that are physically separated from each other during team sports such as hockey, football, soccer, and the like. In order to provide sufficient range, the first communication protocol A operates over a longer range than second wireless communication protocol B. For example, the first communication protocol may operate over a range of at least about 50 meters, or more preferably, a range of at least about 500 meters such as FRS Radio or GMRS Radio.

The use of two wireless communication protocols A and B allows long range communication between team members, while also maintaining user safety because the components in the headset 30 can operate at a low power that represents a negligible or reduced safety risk to users. This can be particularly beneficial to communication systems for use in team sports because the wireless electronics are located in close proximity to the user's head, and may be subject to impacts that could damage the electronics and expose the user to electrical hazards. At the same time, players, coaches, game officials, spectators and other team members in team sports can communicate with each other while separated by large distances.

While a few exemplary communication protocols have been described, other communication protocols may be utilized. For example, the second communication protocol may utilize BlueTooth class 1 or IEEE 802.11 (WiFi) in conjunction with FRS or GMRS radios as the first communication protocol. As another example, the second communication protocol may utilize BlueTooth™ class 3 while the first communication protocol may utilize IEEE 802.11 (WiFi).

In some embodiments, the main transceiver 20 may also include controls 24 for adjusting different parameters associated with the wireless communication device 12, such as volume, operating frequency/channel, encryption codes, hands-free operation, and power on/off. The main transceiver 20 may also include a display 24 for indicating various parameters such as wireless signal strength, volume, frequency/channel selection, encryption code (if any), hand-free on/off (if included), and power on/off.

As shown in the illustrated embodiment, the headset 30 may also include a transmitter 36 and a microphone 38 for enabling the team member to send an outgoing oral message to the main transceiver 20 via the second communication protocol B. The main transceiver 20 can then retransmit the outgoing oral message to another wireless communication device (e.g. the wireless communication device 16) via the first wireless communication protocol A. The combination of the transmitter 36 and microphone in addition to the receiver 32 and speakers 34 generally enables two-way communication between team members.

In some embodiments, the microphone 38 may be selected to reduce the amount of ambient noise being transmitted to other team members. For example, the microphone 38 may include controls for adjusting noise filtration and sensitivity.

The receiver 32 and the transmitter 36 may be integrated into a single transceiver unit mounted to the headset 30. In other embodiments, the receiver 32 and the transmitter 36 may be separate.

While the wireless communication device 12 is capable of providing two-way communication, in some embodiments, the communication system 10 may include other wireless communication devices that provide one-way communication. For example, the wireless communication device 14 may be configured to transmit one-way communications only. In particular, the wireless communication device 14 may include a microphone 50 for enabling a team member to input an oral message, and a transmitter 52 for transmitting the oral message via the first wireless communication A protocol to the wireless communication devices 12 or 16. The one-way wireless communication device 14 permits a team leader such as a coach to send oral messages to one or more team members, for example, to provide instruction or feedback on gameplay. It may be desirable to use one-way communication so as to reduce system costs, particularly when two-way communication is not required.

As another example, the wireless communication device 16 may be configured to receive one-way communications only. In particular, the wireless communication device 16 may include a main transceiver 20a, and a headset 30a that includes a receiver 32a and a single speaker 34a, but no microphone or transmitter.

While the communication system 10 shown in FIG. 1 includes three different wireless communication devices 12, 14 and 16, in some embodiments, the communication system 10 may include other numbers of wireless communication devices, which may be the same, similar or different than the wireless communication devices described.

Referring now to FIG. 2, illustrated therein is a support for mounting the main transceiver 20 to a team member in a location physically remote from the wearable audio device (e.g. the headset 30). The support includes a containment receptacle (e.g. a containment pouch 60) for receiving the main transceiver 20, a mounting plate 70 for supporting the containment pouch on clothing worn by the team member, and two fasteners (e.g. hook and loop fasteners 72 and straps 74) for mounting the containment pouch 60 to the mounting plate 70.

The containment pouch 60 generally has a pocket for receiving the main transceiver and a flap 62 that folds down to cover the pocket and retain the main transceiver within the pouch 60. The pouch 60 helps to contain the main transceiver 20, for example, in the event that an impact (e.g. caused by one player body checking another player) damages the main transceiver 20 and creates debris. The pouch 60 contains that debris and prevents the debris from contaminating the playing surface, which can be particularly beneficial when playing sports such as ice hockey.

The interior or exterior of the pouch may be lined with a soft compressible material such as light foam to reduce the risk of damage to the main transceiver 20 while also reducing the risk of injury to players that might come into contact with the pouch 60 containing the main transceiver 20.

The pouch 60 may also include vents 64 for providing air ventilation so as to cool the main transceiver 20, which may reduce the likelihood of overheating.

The mounting plate 70 generally mounts the containment pouch 60 to clothing worn by the team member such as sporting equipment including shoulder pads, hockey pants, or sports clothing (such as clothing made by Under Armour™). The mounting plate 70 generally has a slim design, which allows it to fit into sporting equipment without interfering with functionality, safety or comfort provided by the equipment. The mounting plate 70 may be manufactured integrally as part of the sporting equipment or may be supplied as an aftermarket accessory that can be attached to the sporting equipment, for example, by sewing the mounting plate 70 to the equipment. The mounting plate 70 may be made from a semi-rigid material such as a polymer and may be covered in a compressible material such as foam.

As shown in FIG. 2, the pouch 60 is mounted to the mounting plate 70 using a first fastener (e.g. a set of hook and loop fasteners 72 such as Velcro™) and a second fastener (e.g. mounting straps 74) for mounting the main transceiver 20 to the sporting equipment. Using two or more fasteners can provide redundancy, which may reduce the likelihood that the pouch will fall off or otherwise detach from the mounting plate 70.

As shown in FIG. 2, the back of the pouch 60 includes strips of hook and loop fasteners 72 that engage corresponding strips of hook and loop fasteners 72 on the mounting plate 70. Furthermore, the pouch 60 and the mounting plate 70 each have a plurality of slits or loop holes 76 for receiving the mounting straps 74. As shown, the slits 76 are oriented so that the straps 74 cross over the flap 62, which tends to help to keep the flap 62 closed so as to contain the main transceiver 20 within the pouch 60.

While the embodiment illustrated in FIG. 2 includes a containment pouch 60 and a mounting plate 70, the main receiver 20 may be mounted to clothing using other types of supports, such as belt clips, fabric pockets in equipment or clothing, and the like.

Figure 3:
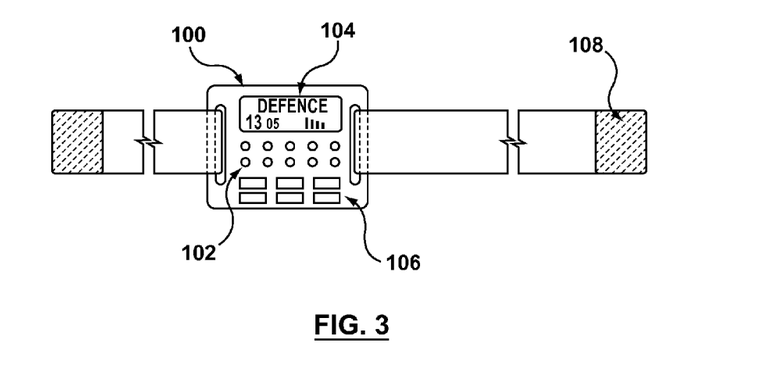
FIG. 3 is a front elevation view of a group routing controller for use with the wireless communication system of FIG. 1.

Referring now to FIG. 3, illustrated therein is a group routing controller 100 that can be used with one of the wireless communication devices 12 or 14 that are capable of transmitting oral messages to other wireless communication devices. The group routing controller 100 allows a team leader to selectively transmit oral messages to individual team members or groups of team members. The group routing controller 100 can be particularly useful for coaches, game officials and other team leaders who want to communicate with particular team members or groups of team members.

Figure 4A:
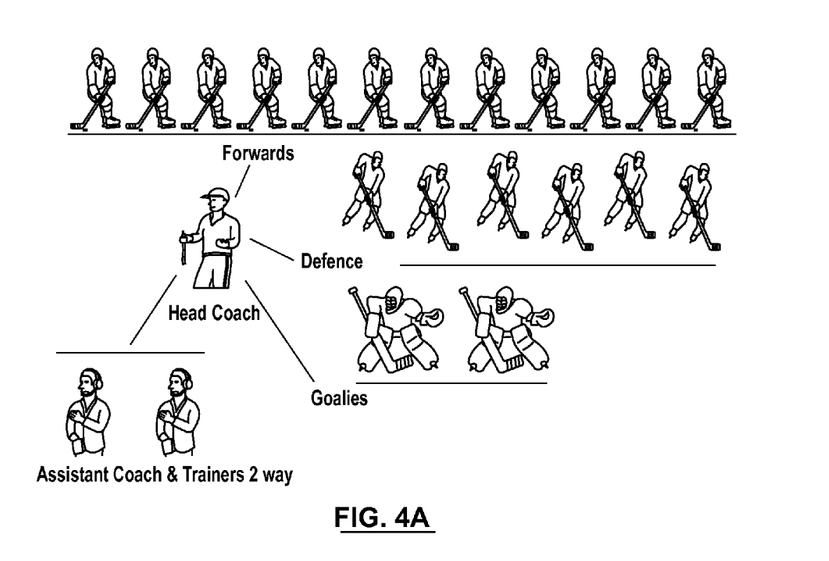
FIG. 4A is a schematic diagram of a hockey coach using the wireless communication system to communicate with team members including forwards, defences, goalies, and assistant coaches.
Figure 4B:
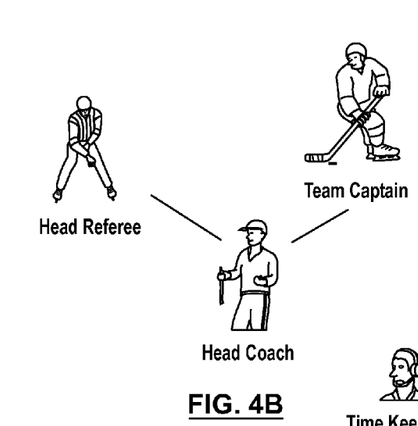
FIG. 4B is a schematic diagram of a hockey coach using the wireless communication system to communicate with team members including a team captain and a head referee.
Figure 4C:
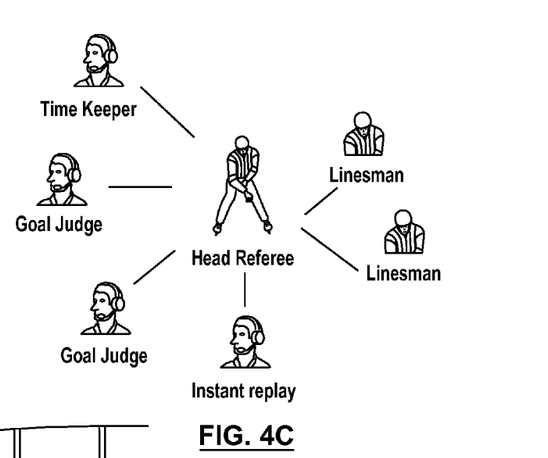
FIG. 4C is a schematic diagram of a head referee using the wireless communication system to communicate with team members including a time keeper, goal judges, instant replay officials, and linesmen.
Figure 4D:
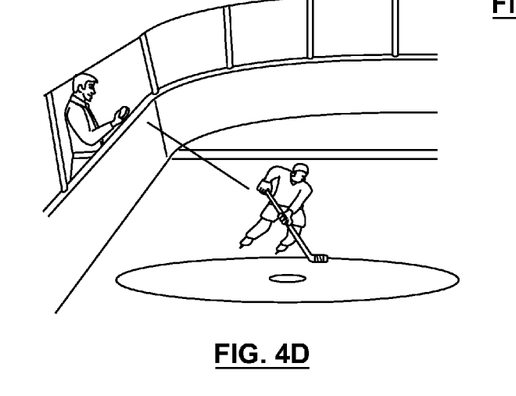
FIG. 4D is a schematic diagram of a spectator using the wireless communication system to communicate with a player.

The group routing controller 100 includes one or more selection actuators 102 (e.g. buttons) for selectively transmitting the oral message to a particular wireless communication device or group of wireless communication devices. As an example, the selection actuators 102 may include individual selection actuators, for example, corresponding to particular team members such as a team captain, head coach, head referee, and the like. The selection actuators 102 may also include group selection actuators that correspond to particular groups of team members. For example, referring to FIG. 4A, some selection actuators 102 might allow a head coach to communicate with entire teams, forward players, defensive players, goalies, and/or coaching staff (including assistant coaches, forward coaches, defensive coaches, goalie coaches, trainers, and other coaching staff). Referring to FIG. 4B, some selection actuators 102 might allow a head coach to communicate with a team captain or a head referee. Referring to FIG. 4C, some selection actuators 102 might allow a head referee to communicate with certain game officials including linesmen, goal judges, instant replay officials, time keepers, and/or other officials. Referring to FIG. 4D, some selection actuators 102 might allow a spectator to communicate with a particular player.

After selecting a particular team member or group, the group routing controller 100 may operate the main transceiver 20 to selectively transmit the oral message to one or more wireless communication devices that correspond to the team member or group selected. For example, the group routing controller 100 may send a wireless signal to the main transceiver 20 that instructs the main transceiver to encrypt the outgoing oral message using a particular encryption code such that a recipient wireless communication device needs to decrypt the message before playing the oral message. In some embodiments, the group routing controller 100 may selectively transmit the message to a particular team member or group using other methods, for example, by sending the oral message using a particular frequency band, or using a particular frequency band in combination with encryption.

The group routing controller 100 may be configured to continue transmitting messages to the selected team member or group until a new team member or group is selected using the selection actuators 102. Furthermore, the group routing controller 100 may be configured so as to transmit messages to multiple team members or groups at the same time by depressing multiple selection actuators 102.

The selection actuators 102 may be pre-programmed, or may be user programmable, for example, by connecting the group routing controller 100 to an electronic computing device such as a personal computer or smart phone (e.g. via a USB port or wireless connection).

While the group routing controller 100 shown in the illustrated embodiment includes ten selection actuators 102, in other embodiments there may more be one or more selection actuators 102. While the group routing controller 100 may have any number of selection actuators 102, it may be desirable to limit the number of selection actuators 102, for example, to make the group routing controller 100 user friendly.

The group routing controller 100 may also include a display 104 for indicating the currently selected team member or group, and other parameters such as signal strength, volume, frequency, encryption code, hands-free on/off, power on/off light, one and two-way communication mode selection, and memory lock on/off.

The group routing controller 100 may also include additional controls 106 for adjusting volume, frequency, encryption code on/off, hands-free mode selection on/off, selection actuator memory lock, and the like.

In some embodiments, the group routing controller 100 may be worn on a team leader's arm or wrist using a mounting strap 108 and may be in wireless communication with the main transceiver 20, for example, using the first or second wireless protocol, or another wireless protocol. In other embodiments, the group routing controller 100 may be hardwired to the main transceiver 20, or may be integrated with the main transceiver 20. In yet other embodiments, the group routing controller 100 may be incorporated in another type of wireless communication device that does not include a main transceiver, such as the wireless communication device 14.

Figure 5:
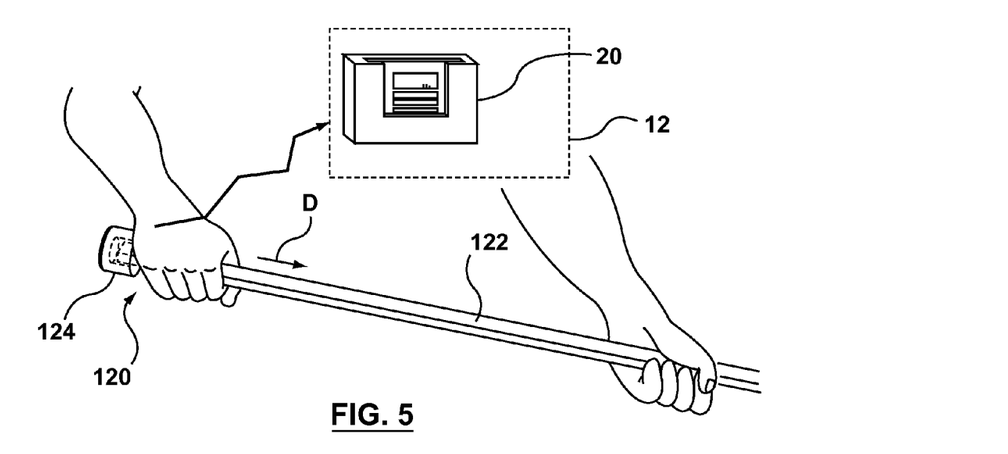
FIG. 5 is a perspective view of a stick trigger for handsfree operation of one of the wireless communication devices of FIG. 1.

Referring now to FIG. 5, illustrated therein is a stick trigger 120 for use with the wireless communication device 12 in embodiments for use with hockey teams. As shown, the stick trigger 120 is mounted to a hockey stick shaft 122 and is in communication with the main transceiver 20 such that actuating the stick trigger 120 enables transmission of the outgoing oral message. The stick trigger 120 allows "handsfree" operation of the wireless communication device 12 such that the team member can operate the wireless communication device 12 with limited use of their hands, and in particular, such that the team member can hold a hockey stick while operating the wireless communication device 12.

In the illustrated embodiment, the stick trigger 120 includes a butt end trigger 124 mounted to a butt end of the hockey stick shaft 122. Pushing the butt end trigger 124 longitudinally inward relative to the shaft 122 (i.e. in the direction D) enables transmission of the outgoing oral message.

Figure 6:
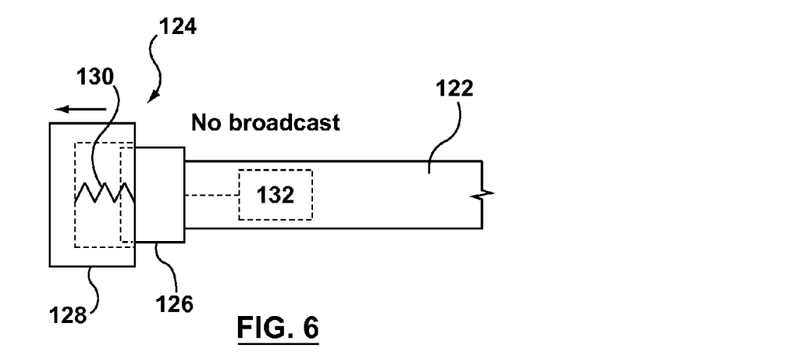
FIG. 6 is a side elevation view of the stick trigger of FIG. 5 in a deactivated position.
Figure 7:
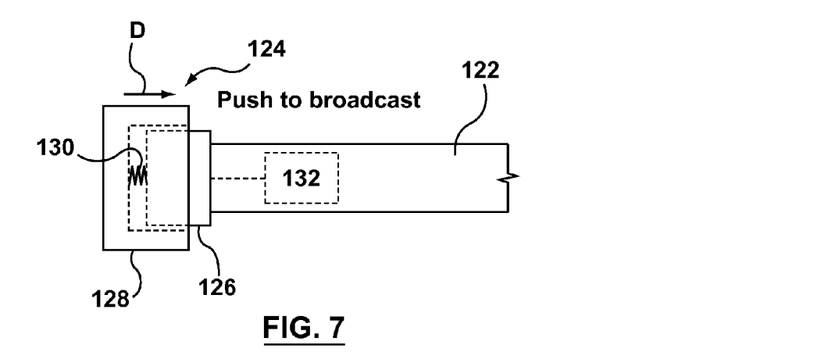
FIG. 7 is a side elevation view of the stick trigger of FIG. 5 in an activated position for transmitting outgoing oral messages using the wireless communication device.

Referring to the FIGS. 6 and 7, the butt end trigger 124 includes a ring shaped momentary push button mounted to the butt end of the shaft 122. The push button includes a base 126 and an actuator 128 slidably mounted to the base 126, for example, by providing the actuator 126 with a circular recess sized to receive the base 126. A spring 130 located between the base 126 and actuator 128 (e.g. within the recess) biases the actuator 128 toward a deactivated position as shown in FIG. 6.

The butt end trigger 124 also includes a wireless transducer 132 for communication with the main transceiver 20. The transducer 132 is connected to the push button such that pushing the actuator 128 inward along the direction D causes the wireless transducer 132 to send a signal to the main transceiver 20, which initiates transmission of the outgoing oral message.

When the team member pushes the actuator 128 inward, the spring 130 compresses between the base 126 and actuator 128. When the team member releases the actuator 128, the spring 130 automatically forces the actuator 128 back to the deactivated position and ends the transmission.

The base 126 and actuator 128 may be made of a durable material, such as rubber or another plastic, and may enclose components of the stick trigger 122 such as the wireless transducer 132 and other electronic components mounted to the butt end of the shaft 122.

The stick trigger 120 allows selective transmission of outgoing messages, which can reduce the amount of ambient noise transmitted to other team members, for example, by allowing the team member to transmit messages at particular times, as opposed to continuously transmitting all sounds. The stick trigger 120 also allows a team member (e.g. a puck carrier) to communicate with other team members (e.g. another player on the ice) while performing in-game manoeuvres (e.g. stick handling, shooting, and the like) without interrupting their focus or playing functionality.

Figure 8:
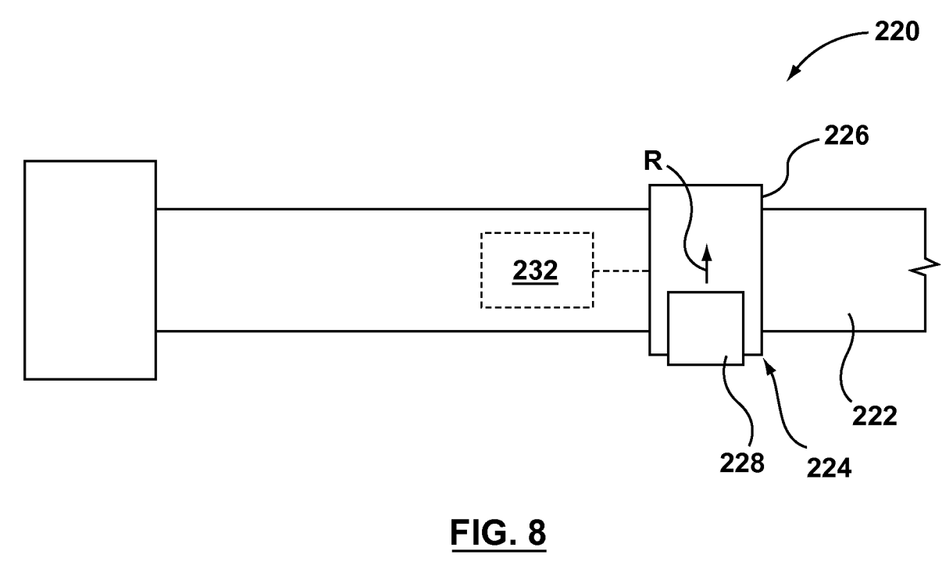
FIG. 8 is a side elevation view of another type of stick trigger for handsfree operation of one of the wireless communication devices of FIG. 1.
Figure 9:
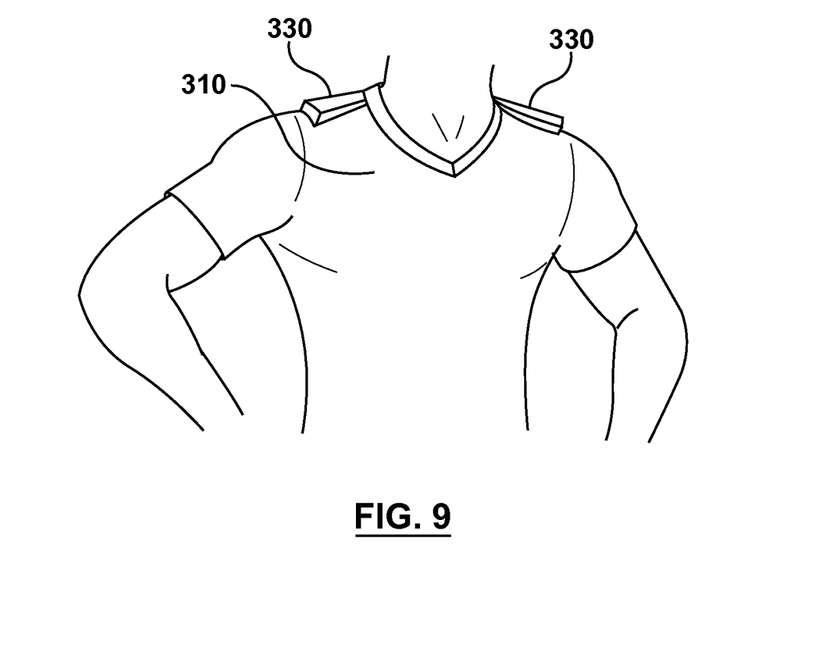
FIG. 9 is a perspective view of a shirt with two epaulet speakers for use with the wireless communication system of FIG. 1.

Referring to FIG. 8, illustrated therein is another type of stick trigger 220 for use with the wireless communication device 12.

The stick trigger 220 includes a push button 224 comprising a base 226 shaped as a ring mounted around the hockey stick shaft 222 and an actuator 228. The push button 224 is activated by pressing the actuator 228 radially inward along the direction R, which causes a wireless transducer 232 to send a signal to the main transceiver 20 so as to initiate transmission of an outgoing oral message.

As shown, the push button 224 is positioned on the stick shaft 222 so that a player can activate the push button 224 using their finger while holding the hockey stick. In particular, the push button 224 is spaced apart from the end of the stick shaft 222 by about 2-inches to 6-inches so that the user can activate the push button while holding the butt end of the hockey stick. In other embodiments, the push button 224 may be located further down the stick shaft 222 so that the player can depress the push button 224 with their other hand.

Referring now to FIGS. 9-12, there is a shirt 310 having two epaulet speakers 330 mounted to the shirt near the shoulders of a team member. The epaulet speakers 330 are another type of wearable audio device for use with the wireless communication system 10. In particular, the epaulette speakers 300 are generally used with the wireless communication device 12 and replace the headset 30 for generating audio corresponding to an incoming oral message. The epaulet speakers 330 can be used in sports that do not use a helmet such as soccer, baseball, track and field, and figure skating.

Figure 10:
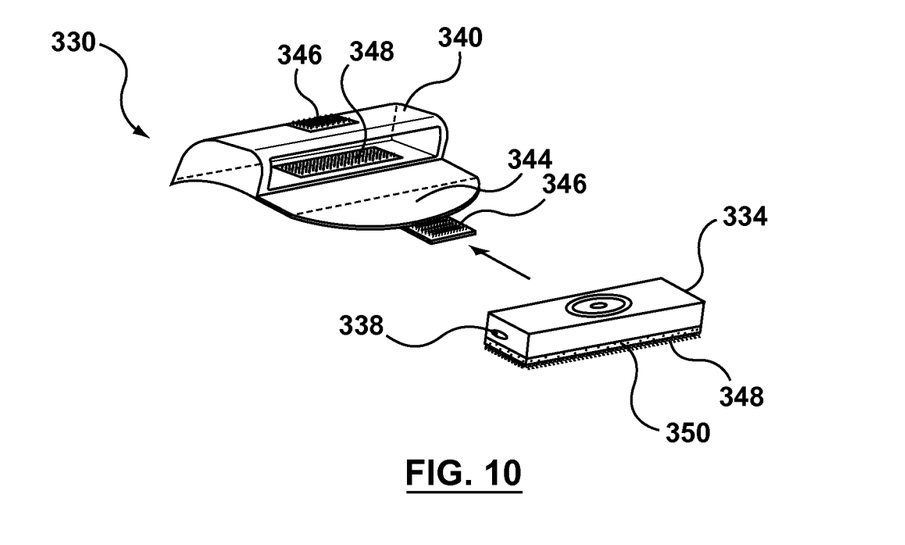
FIG. 10 is a partially exploded perspective view of one of the epaulet speakers of FIG. 9.

As shown in FIG. 10, each epaulet speaker 330 includes a speaker assembly 334 and an epaulet receptacle 340 for receiving the speaker assembly 334. The epaulet receptacle 340 is affixed to the shirt 310 near the shoulders of the team member, for example, by sewing a piece of fabric to the shirt 310 so as to form a pouch or pocket for receiving the speaker assembly 334. The epaulet receptacle 340 also includes a flap 344, which folds over to cover the pocket and retain the speaker assembly 334 within the epaulet receptacle 340.

Figure 11:
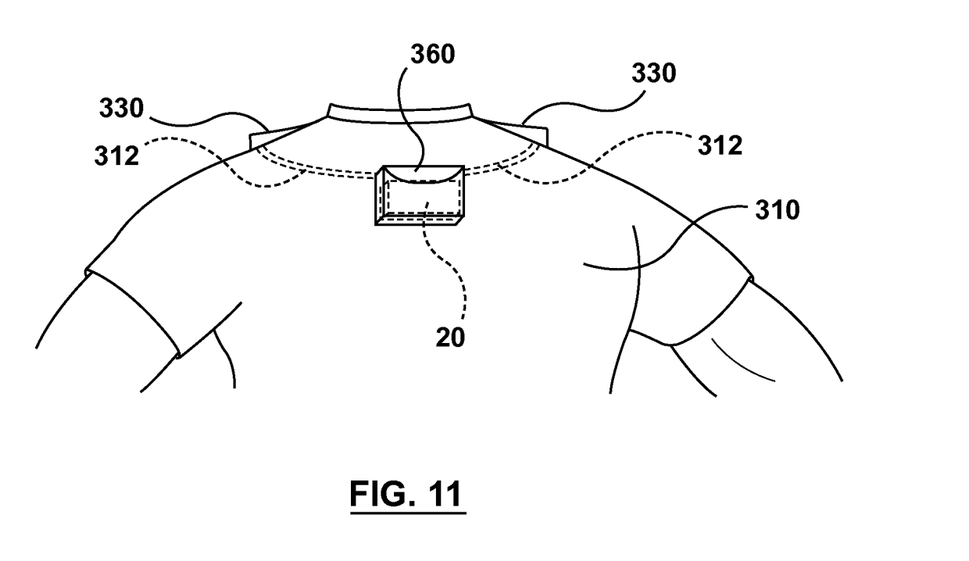
FIG. 11 is a perspective view of the shirt and epaulet speakers of FIG. 1 with the main transceiver mounted to the shirt using a containment receptacle.

The speaker assembly 334 is generally in communication with the main transceiver 20 so that the speaker assembly 334 can generate audio corresponding to an incoming oral message from another wireless device. For example, as shown in FIGS. 10 and 11, the speaker assembly 334 may include a speaker wire terminal 338 for connecting the speaker assembly 334 to the main transceiver 20 via a wire extending through wire conduits 312 in the shirt 310. In other embodiments, the speaker 334 may be in wireless communication with the main transceiver 20, for example, via a wireless receiver or transceiver as described previously with respect to the headset shown in FIG. 1.

Each epaulet speaker 330 also includes two fasteners for holding the speaker assembly 334 within the epaulet receptacle 340. In particular, there is a first fastener in the form of a first set of hook and loop fasteners 346 located on the flap 344 and the outer surface of the epaulet receptacle 340 for holding the flap 344 closed. There is also a second fastener in the form of a second set of hook and loop fasteners 348 located on the back of the speaker assembly 334 and on the interior surface of the epaulet receptacle 340 (i.e. within the pocket) for retaining the speaker assembly 334 within the epaulet receptacle 340. The combination of the first and second fasteners tends to provide redundancy so as to retain the speaker assembly 334 within the epaulet receptacle 340 even if one of the fasteners malfunctions or otherwise becomes unfastened.

In some embodiments, the epaulet receptacle 340 may be lined with a compressible material such as foam to provide comfort and shock absorption while minimizing interference to the mobility of the user. Furthermore, a foam pad 350 may be attached to the back of the speaker assembly 334 between the speaker assembly 334 and the hook and loop fasteners 348 to provide further shock absorption and comfort.

Figure 12:
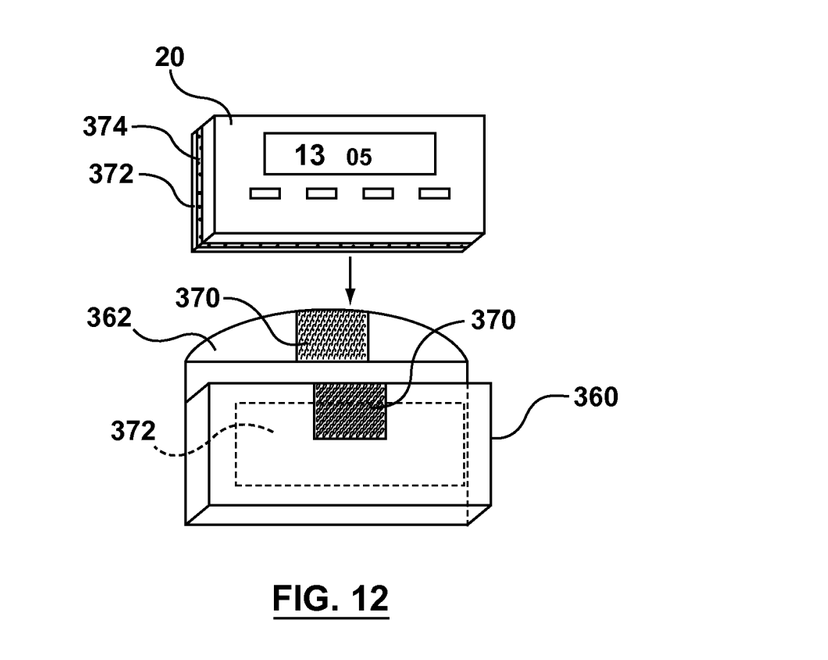
FIG. 12 is a partially exploded perspective view of the containment receptacle of FIG. 11.

Referring now to FIGS. 11 and 12, the main transceiver 20 is also mounted to the shirt 310 using a containment receptacle 360. The containment receptacle 360 is affixed to the shirt 310, for example, by stiches or the like. The receptacle 360 generally has a pocket for receiving the main transceiver 20 and a flap 362 that folds down to cover the pocket and retain the main transceiver 20 within the receptacle 360.

The receptacle 360 also includes two fasteners for retaining the main transceiver 20 within the pocket on the shirt 310. In particular, there is a first fastener in the form of a first set of hook and loop fasteners 370 located on the flap 362 and the outer surface of the receptacle 360 for holding the flap 362 closed. There is also a second fastener in the form of a second set of hook and loop fasteners 372 located on the back of the main transceiver 360 and on the interior surface of the receptacle 360 (i.e. within the pocket) for retaining the main transceiver 20 within the receptacle 360.

As shown in FIG. 11, the receptacle 360 is located on the back of the shirt 310 just below the neck of the team member. This location tends to provide comfort while minimizing interference to the mobility of the user, which may be particularly desirable when participating in athletic activities such as team sports. To provide further comfort, a foam pad 374 may be attached to the back of the main transceiver 20 between the hook and loop fasteners 374 and the main transceiver 20. In some embodiments, the entire outside surface of the main transceiver 20 may be covered in foam or another compressible material. Furthermore, the containment receptacle 360 may be lined with a similar compressible material.

Figure 13:
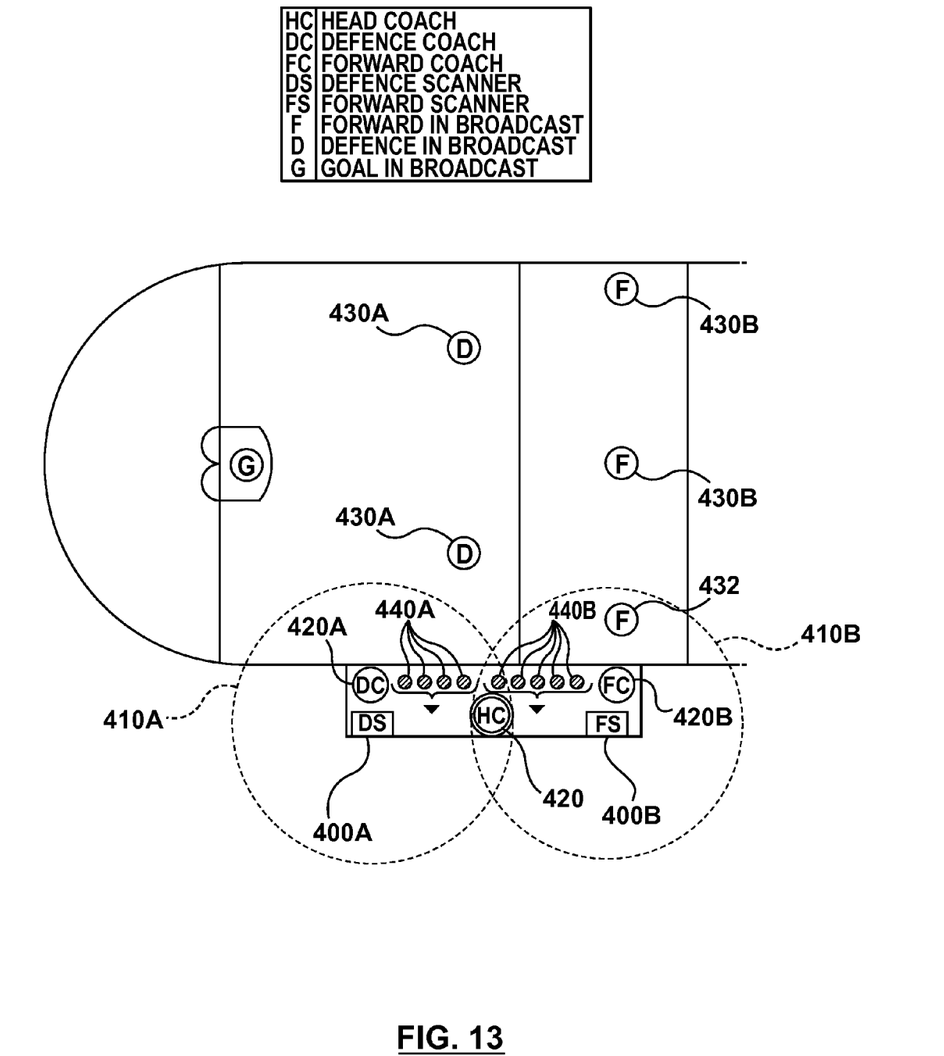
FIG. 13 is a schematic diagram of members of a wireless communication system that uses scanners to broadcast messages to team members that are located outside a detection area of the scanners.

Referring now to FIG. 13, the wireless communication system 10 may include one or more scanners 400A, 400B for detecting nearby team members. The scanners 400A, 400B can allow the wireless communication system 10 to automatically select which team members receive oral messages. For example, the wireless communication system 10 may broadcast messages only to team members that are located beyond the range of the scanners 400A, 400B. This allows a team leader such as a head coach 420 to send oral messages to active team members 430A, 430B currently located on a playing surface such as an ice rink, while other team members 440A, 440B on the bench do not receive the messages.

The scanners 400A, 400B may use any suitable device for detecting team members. For example, the scanners 400A, 400B may use radio-frequency identification (RFID) to detect RFID tags associated with each team member. The RFID tags may be integrated into the wireless communication device worn by each team member, or the RFID tags may be separately worn by each team member. While RFID technology has been described, the scanners could use infra-red scanners or another scanning device.

The scanners 400A, 400B are generally configured to detect team members within corresponding detection areas 410A, 410B. The wireless communication system 10 then uses information from the scanners 400A, 400B to selectively transmit messages to team members located outside the detection areas 410A, 410B and not team members located within the detection areas 410A, 410B.

For example, the wireless communication system 10 may define a broadcast group that initially includes all team members. The wireless communication system 10 may then receive information from the scanners 400A, 400B (e.g. via wired or wireless communication) in order to update the broadcast group by removing team members located within the detection areas 410A, 410B. Messages can then be sent to the remaining team members in the broadcast group.

In some embodiments, the wireless communication system 10 may also add players back to the broadcast group if they are not located within the detection areas 410A, 410B. Furthermore, the wireless communication system 10 may update the members of the broadcast group continuously or at regular intervals.

Referring still to FIG. 13, the detection areas 410A, 410B may be sized and shaped to cover a particular area such as a team bench, a side-line, or an area near a coach.

In some embodiments, the detection areas 410A, 410B may have a short range. For example, the detection areas 410A, 410B may have a nominal size of less than about 10-meters, or more particularly, less than about 3-meters.

This may reduce the chance of mistakenly detecting a player that is currently on the ice but near the bench. In the event that the system removes an active player near the bench (e.g. player 432), it is understood that such a player would still be able to hear instructions from the coach.

As shown in FIG. 13, there may be a first scanner 400A and a second scanner 400B. The first scanner 400A may be a defence scanner "DS" having a first detection area 410A for scanning defence players 440A on the bench, while the second scanner 400B may be a forward scanner "FS" having a second detection area 410B for scanning forward players 440B on the bench. While the illustrated embodiment includes two scanners 400A, 400B, in some embodiments, there may be one or more scanners.

In some embodiments, the wireless communication system 10 may be configured so that certain team leaders communicate with certain groups of team members. For example, with reference to the system shown in FIG. 13, the head coach 420 may communicate with all players on the ice 430A, 430B and all coaches 420A, 420B. At the same time, a defensive coach 420A may selectively communicate with only the defensive players 430A on the ice, and an offensive coach 420B may selectively communicate with only the offensive players 430B on the ice.

Figure 14:
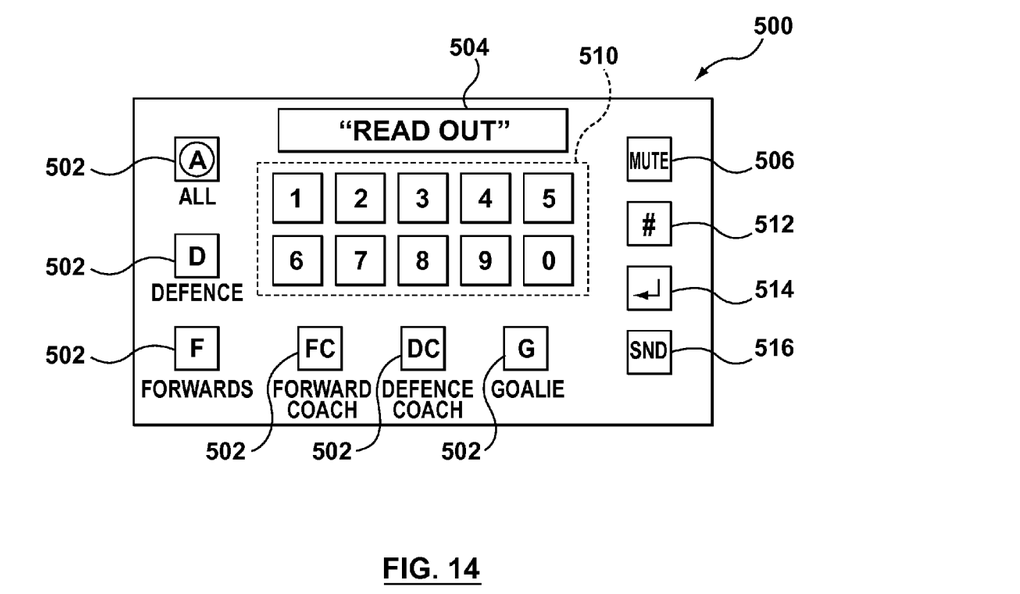
FIG. 14 is a front elevation view of a group routing controller for use with a wireless communication system.

Referring now to FIG. 14, illustrated therein is a group routing controller 500 according to another embodiment. The group routing controller 500 is similar in some respects to the group routing controller 100 and similar elements are given similar reference numerals incremented by four hundred. For example, the group routing controller 500 includes selection actuators 502 (e.g. for selecting groups such as "all", "defence", "forwards", or for selecting individuals such as a "forward coach", "defence coach" or "goalie"), a display 504, and additional controls 506 (e.g. a "mute" button).

The group routing controller 500 also includes a keypad 510 and additional selection actuators 512, 514, 516 for programing and customizing who receives broadcasted messages. As shown, the keypad 510 includes selection actuators in the form of numeric keys corresponding to numbers "0" to "9". The additional selection actuators 512, 514, 516 include keys labelled "#", "↵", and "SND" respectively. The function of these actuators will be described below.

The keypad 510 allows a user to individually send messages to a particular player by selecting their respective player number. Initially pressing the "#" actuator 512 indicates that a player is going to be selected by entering their player number using the keypad 510. Once the player number has been entered, pressing the "SND" actuator 516 completes the entry and allows messages to be sent to the selected player. For example, a coach may press the "#", "1", "6", "SND" in order to send messages to player number "16".

A user can also send messages to a customized group of team members. For example, initially pressing "↵" (actuator 514) indicates that a customized group is going to be selected using pre-programmed selection actuators or using player numbers. For example, pressing "↵", "F", "FC", "#", "2", "3", "SND" may allow the user to send messages to the forwards "F", the forward coach "FC", and player number "23". Messages will continue being sent to the selected team member or group until a new selection is made.

While some of the embodiments described herein relate specifically to wireless communication systems and components thereof for use in sports, the embodiments herein may also be used by other teams such as movie production teams, teams working in a doctor's office, live theatre teams, teams of employees in a retail store, and teams in other industrial or commercial applications.

While the above description provides examples of one or more apparatus, methods, or systems, it will be appreciated that other apparatus, methods, or systems may be within the scope of the present description as interpreted by one of skill in the art.

The invention claimed is:

1. A wireless communication system for use by members of a team, the wireless communication system comprising:
  (a) a first wireless communication device for a first team member, the first wireless communication device comprising:
    (i) a microphone for enabling the first team member to input an oral message; and
    (ii) a transmitter for transmitting the oral message via a first Wireless communication protocol; and
  (b) a second wireless communication device for a second team member, the second wireless communication device comprising:
    (i) a main transceiver for receiving the oral message from the first wireless communication device via the first wireless communication protocol and for retransmitting the oral message via a second wireless communication protocol;
    (ii) a wearable audio device comprising a receiver for receiving the oral message from the main transceiver via the second wireless communication protocol, and at least one speaker in communication with the receiver for generating audio corresponding to the oral message, wherein the speaker is mounted to the wearable audio device so as to be spaced apart from an ear of the second team member such that the second team member is able to hear ambient sound in addition to the oral message; and
    (iii) a support for mounting the main transceiver to the second team member in a location physically remote from the wearable audio device;
  (c) wherein the second wireless communication protocol operates at a lower power than the first wireless communication protocol, and wherein the first communication protocol operates over a longer range than second wireless communication protocol;
  (d) wherein the wearable audio device of the second wireless communication device comprises a transmitter and a microphone in communication with the transmitter for enabling the second team member to send an outgoing oral message to the main transceiver via the second communication protocol, and wherein the main transceiver is configured to retransmit the outgoing oral message to another wireless communication device via the first wireless communication protocol; and
  (e) wherein the second wireless communication device further comprises a stick trigger mountable to a hockey stick, and wherein the stick trigger is in communication with the main transceiver such that actuating the stick trigger enables transmission of the outgoing oral message.

2. The wireless communication system of claim 1, wherein the stick trigger includes a but end trigger mountable to a butt end of the hockey stick for slidable movement along the hockey stick such that pushing the butt end trigger longitudinally inward toward the hockey stick enables transmission of the outgoing oral message.

3. The wireless communication system of claim 1, wherein the stick trigger includes a push button mountable to a shaft of the hockey stick, the push button being depressible in a radial direction transverse to the hockey stick shaft such that depressing the push button enables transmission of the outgoing oral message.

4. The wireless communication system of claim 1, wherein the stick trigger is manufactured integrally with the hockey stick.

5. The wireless communication system of claim 1, wherein the wearable audio device is a headset mountable to a helmet.

6. The wireless communication system of claim 1, wherein the wearable audio device comprises epaulet speakers.

7. The wireless communication system of claim 1, wherein the second wireless communication protocol operates at a power of less than about 3-milliwatts.

8. The wireless communication system of claim 7, wherein the second wireless communication protocol operates over a maximum range of less than about 10-meters.

9. The wireless communication system of claim 1, wherein the first communication protocol operates over a range of at least about 50 meters.

10. The wireless communication system of claim 9, wherein the first wireless communication protocol operates at a minimum power of at least about 50-milliwatts.

11. A wireless communication system for use by members of a team, the wireless communication system comprising:
   (a) a first wireless communication device for a team leader, the first wireless communication device comprising:
      (i) a microphone for enabling the team leader to input an oral message; and
      (ii) a transmitter for transmitting the oral message via a first wireless communication protocol;
   (b) a plurality of second wireless communication devices, each of the second wireless communication devices being usable by a respective team member and comprising:
      (i) a main transceiver for receiving the oral message from the first wireless communication device via the first wireless communication protocol and for retransmitting the oral message via a second wireless communication protocol;
      (ii) a wearable audio device comprising a receiver for receiving the oral message from the main transceiver via the second wireless communication protocol, and at least one speaker in communication with the receiver for generating audio corresponding to the oral message, wherein the speaker is mounted to the wearable audio device so as to be spaced apart from an ear of the respective team member such that the respective team member is able to hear ambient sound in addition to the oral message; and
      (iii) a support for mounting the main transceiver to the respective team member in a location physically remote from the wearable audio device; and
   (c) at least one scanner for detecting team members within a detection area, and wherein the first wireless communication device transmits the oral message to team members located outside the detection area and not team members located within the detection area;
   (d) wherein the second wireless communication protocol operates at a lower power than the first wireless communication protocol, and wherein the first communication protocol operates over a longer range than second wireless communication protocol; and
   (e) wherein the first wireless communication device comprises a group routing controller for selectively transmitting the oral message to at least one of the second wireless communication devices.

12. The wireless communication system of claim 11, wherein the group routing controller includes a group selection actuator for selectively transmitting the oral message to at least one group of the second wireless communication devices.

13. The wireless communication system of claim 11, wherein the group routing controller includes a plurality of group selection actuators for selectively transmitting the oral message to a plurality of groups of the second wireless communication devices.

14. A wireless communication device for use by a team member, the wireless communication device comprising:
   (a) a main transceiver for receiving an incoming oral message from another wireless communication device via a first wireless communication protocol and for retransmitting the oral message via a second wireless communication protocol;
   (b) a wearable audio device comprising a receiver for receiving the oral message from the main transceiver via the second wireless communication protocol, and at least one speaker in communication with the receiver for generating audio corresponding to the oral message, wherein the speaker is mounted to the wearable audio device so as to be spaced apart from an ear of the team member such that the team member can hear ambient sounds in addition to the oral message; and
   (c) a support for mounting, the main transceiver to the team member in a location physically remote from the wearable audio device;
   (d) wherein the second wireless communication protocol operates at a lower power than the first wireless communication protocol, and wherein the first communication protocol operates over a longer range than second wireless communication protocol;
   (e) wherein the wearable audio device comprises a transmitter and a microphone in communication with the transmitter for enabling the team member to send an outgoing oral message to the main transceiver via the second communication protocol, and wherein the main transceiver is configured to retransmit the outgoing oral message to at least one other wireless communication device via the first wireless communication protocol; and
   (f) a stick trigger mountable to a hockey stick, wherein the stick trigger is in communication with the main transceiver such that actuating the stick trigger enables transmission of the outgoing oral message.

15. The wireless communication device of claim 14, wherein the support comprises:
   (a) a containment receptacle for receiving the main transceiver;
   (b) a mounting plate for supporting the containment receptacle on clothing worn by the team member;
   (c) a first fastener for mounting the containment receptacle to the mounting plate; and
   (d) a second fastener for mounting the containment receptacle to the mounting plate.

* * * * *

UNITED STATES PATENT AND TRADEMARK OFFICE
CERTIFICATE OF CORRECTION

PATENT NO.        : 9,071,901 B2
APPLICATION NO.   : 13/593642
DATED             : June 30, 2015
INVENTOR(S)       : Bruce Black Page 1 of 1

It is certified that error appears in the above-identified patent and that said Letters Patent is hereby corrected as shown below:

In the claims

Column 14, line 13 delete "first Wireless communication protocol; and" and replace with "first wireless communication protocol; and"

Column 14, line 57 delete "a but end trigger mountable to a butt" and replace with "a butt end trigger mountable to a butt"

Column 16, line 30 delete "a support for mounting, the main transceiver to the team" and replace with "a support for mounting the main transceiver to the team"

Signed and Sealed this
Twenty-second Day of December, 2015

Michelle K. Lee
*Director of the United States Patent and Trademark Office*